United States Patent
Ratnaraj et al.

(10) Patent No.: US 6,185,567 B1
(45) Date of Patent: Feb. 6, 2001

(54) AUTHENTICATED ACCESS TO INTERNET BASED RESEARCH AND DATA SERVICES

(75) Inventors: Paul J. Ratnaraj, Sicklerville, NJ (US); William Gerard McCartney, Philadelphia, PA (US); Son To, Philadelphia, PA (US); Steven J. Crispi, Philadelphia, PA (US); Jalal D. Akhavein, New York, NY (US)

(73) Assignee: The Trustees of the University of Pennsylvania, Philadelphia, PA (US)

(*) Notice: Under 35 U.S.C. 154(b), the term of this patent shall be extended for 0 days.

(21) Appl. No.: 09/087,184

(22) Filed: May 29, 1998

(51) Int. Cl.[7] ............................................... G06F 17/30
(52) U.S. Cl. .............................. 707/10; 705/26; 707/5; 707/8; 707/100; 709/203
(58) Field of Search .................................. 707/2–6, 10, 8, 707/100, 103, 202; 705/26, 27; 709/203

(56) References Cited

U.S. PATENT DOCUMENTS

| | | | |
|---|---|---|---|
| 5,398,336 | * 3/1995 | Tantry et al. | 707/103 |
| 5,708,780 | 1/1998 | Levergood et al. | 395/200.12 |
| 5,778,367 | * 7/1998 | Wesinger, Jr. et al. | 707/10 |
| 5,819,255 | * 10/1998 | Celis et al. | 707/2 |
| 5,826,014 | * 10/1998 | Coley et al. | 395/187.01 |
| 5,826,265 | * 10/1998 | Van Huben et al. | 707/8 |
| 5,859,972 | * 1/1999 | Subramaniam et al. | 709/203 |
| 5,920,873 | * 7/1999 | Van Huben et al. | 707/202 |
| 5,937,406 | * 8/1999 | Balabine et al. | 707/100 |
| 5,963,915 | * 10/1999 | Kirsch | 705/26 |
| 6,094,654 | * 7/2000 | Van Huben et al. | 707/8 |

* cited by examiner

Primary Examiner—Hosain T. Alam
Assistant Examiner—Shahid Alam
(74) Attorney, Agent, or Firm—Woodcock Washburn Kurtz Mackiewcz & Norris LLP

(57) ABSTRACT

Access to a database is provided via the Internet using a World Wide Web server including a search engine, a CGI gateway and user selectable data queries for extracting data, generating reports, and the like. Access by the user is authenticated by querying the user's central machine for authentication. The authentication process operates by sending a page request from the web browser through three checkpoints before the requested page can be served to the web browser. The first checkpoint determines if the requested page is protected. If not, the requested page is served to the web browser. However, if the requested page is protected, the authentication process on the web server checks the host name of the system where the page request is coming from. If the domain of the requesting host is the same domain specified in the web authentication configuration, then the requested page is served to the web browser. However, if the page request is determined to come from outside of the domain of the web server, then the authentication process checks a "cookie" from the web browser to determine if the requesting user has been authenticated as an authorized user earlier in the same session. If the cookie has been "set" during the login procedure, then the requested page is served to the web browser. Otherwise, the user is prompted with a login page. After the user ends the web browser session, the cookie is cleared. Data Query software at the web server permits queries initiated via a web browser to be completed off-line and the results e-mailed to the initiator of the request.

5 Claims, 4 Drawing Sheets

(CONVERSION TO WRDS FORMAT)

AUTHENTICATED ACCESS TO INTERNET BASED RESEARCH AND DATA SERVICES

BACKGROUND OF THE INVENTION

1. Field of the Invention

The present invention relates to a database management system that converts data from a plurality of data sources in a variety of different data formats into a common format which can be accessed and searched via a common database interface and, more particularly, to a database management system that provides authenticated access to the common database interface via a web server and which enables the user to search the data across several data sets.

2. Description of the Prior Art

In recent years, the use of large and complex data sets has grown dramatically. This usage explosion has required users of the data sets to experiment with better access and management methodologies for a diverse and dynamic user environment. For several years, Wharton Business School has been managing large financial data sets with the SAS® System for delivering financial information in an academic environment. Since late 1995, Wharton has provided access to large financial data sets from a variety of data vendors using the SAS® System and the World Wide Web. This system is known as the Wharton Research Data System (WRDS).

Large financial data sets have been used for financial research for many years. The financial data sets widely used at business schools include market research data (such as CRSP, Fama and Market Indices), corporate data (such as Compustat), and banking and insurance data (such as BEST and FDIC). Prior to development of WRDS, the data sets were stored on large VMS/VAX systems and users had to run FORTRAN programs to analyze or extract data. Desktop tools such as Systat and Excel were also available, but working with the data using these desktop tools required that the user be familiar with the formats of the data sets, FORTRAN programming, mainframe to PC file transfer techniques, the VMS operating system, and the data import format of the desktop software. Such systems were cumbersome, difficult to support, and slow. Moreover, changes in data format required updating many programs written to index the data.

To avoid the limitations of specialized management programs, commercial database management systems such as FAME, DART, and Intelligent Query were developed. While these systems provided good data manipulation tools, they generally lacked strong analytical tools and were not suitable for time-series financial data. Also, extensive programming was required to convert the wide selection of data sets used in conventional database researching.

Accordingly, WRDS was developed to use SAS® (and SAS/ASSIST®) to extract and analyze the data, to manage data sets centrally while providing network access to the complete series of data on UNIX systems, and to provide X-Window access to UNIX systems. SAS® provided a single, unified tool for data management and analysis and has proven to be much more efficient than conventional FORTRAN programming techniques. Moreover, because the same data tool was used for all data sets, users of WRDS could easily analyze data across different SAS® data sets.

Unfortunately, access to WRDS was limited by its VT100 interface for those accessing the data from a remote location. Thus, it was desired to connect WRDS to the Internet so that users could select the desired financial data via the Internet. However, since the data sets were proprietary and were generally purchased from vendors, the contents of the data sets could not be released to the general public via the Internet. As a result, two web servers were connected to WRDS: a World Wide Web server for serving the worldwide community, and an Intranet server for serving the Wharton community.

The Intranet could be accessed using conventional UNIX authentication techniques. However, authenticated access to WRDS via the Internet is much more problematic, for in the UNIX environment, user authentication for Internet access is very complex if the Netscape default database authentication scheme is not used. Since distributed computing systems typically have accounts on the respective machines while the Web servers are centrally managed, using Netscape's default authentication scheme will generally require the users to take out another account and to manage another password. A customized unified authentication scheme was thus developed to enable a Netscape server to query the distributed computers for verification; however, that customized authentication scheme required countless hours of programming Netscape's application programming interface (NSAPI).

Accordingly, an improved authentication technique is desired that allows databases such as WRDS to be accessed via the Internet using an authentication code that can be easily verified without requiring an additional account management system or significant amounts of customized software.

Also, web browsers which submit search queries via the World Wide Web typically wait for the search process to finish and timeout if the search is not completed within a set period of time, such as five minutes. However, searching large data sets using sophisticated data queries may take longer than the set time and the system will timeout without the user getting the requested data. The user is also prevented from using the web browser for other functions or from logging off the World Wide Web until the search process is completed and the results returned. An off-line method for completing search queries initiated via the World Wide Web would greatly facilitate the searching of large databases, such as WRDS, accessed via the World Wide Web.

The present invention has been designed to meet these needs in the art.

SUMMARY OF THE INVENTION

The present invention relates to authenticated access to a database management system that is relational, hierarchical, and sequential in nature. In a preferred embodiment, data from a plurality of data sources in a variety of different data formats is converted by the database management system into a common format which can be accessed and searched via a common database interface. Access to the common database interface is provided over the Internet using a World Wide Web server including a search engine, a CGI gateway and user selectable data queries for extracting data, generating reports, and the like. The user accesses the common database interface over the Internet using a conventional web browser at a remote client terminal.

In accordance with a first aspect of the invention, the remote user's access is authenticated by querying a central authority for individual users, rather than relying on the web server to manage a database of users for authentication purposes. The authentication process operates by sending a page request from the web browser through three checkpoints before the requested page can be served to the web browser. The first checkpoint determines if the requested page is protected. If not, the requested page is served to the web browser. However, if the requested page is protected, the authentication process on the web server checks the host name of the system where the page request is coming from. If the domain of the requesting host is within the domain specified in the web authentication configuration (i.e., the requesting host is within the domain of the web server), then the requested page is served to the web browser. However, if the page request is determined to come from outside of the domain of the web server, then the authentication process checks a "cookie" from the web browser to determine if the requesting user has been authenticated as an authorized user earlier in the same session. If the cookie has been "set", then the requested page is served to the web browser. Otherwise, the user is prompted with a login page.

On the login page, the user selects one of the user systems for accessing the database from a list and enters his or her user ID for the system as well as a password, as would be done in a conventional UNIX environment. This information is validated through program calls to the specified system. If the information supplied is valid, the requested web page is served and a valid cookie is sent to the user's web browser so that the user will not be prompted to login again during the same browser session. After the user ends the web browser session, the cookie is cleared. If at any time the account information is invalid (e.g., the cookie expires), the user is again prompted with the login page.

Since cookies are conventionally generated and transmitted between web servers and web browsers, the technique of the invention permits system based authentication without adding any special account management requirements.

In accordance with a second aspect of the invention, the web server interface to the user includes a criteria specification interface form which is processed by data query software on the server side to provide an advanced data query function that gives the user flexibility in screening and formatting subsets of complex financial data. Unlike simple data query web forms, the advanced data query function gives the user the ability to search through multiple data sets with a single query. The advanced data query also provides for unlimited filtering of key values from a list on the user's account. Another feature of the advanced data query function allows users to specify criteria for selection based on common data fields, or primary keys, in the specified data sets. Format options for the output data include comma delimited text, fixed-width text, HTML tables, or a SAS transport file. In addition, each of the format options can be compressed in one of a variety of common compression formats to minimize download time.

In accordance with another aspect of the invention, the data query software uses the advanced data query software to emulate batch processing of queries by spawning a child process for the data request and monitoring its status. When the process is finished, the user is sent an e-mail message that contains a URL address where the output can be retrieved. This approach is different from common web queries which wait for the process to finish and timeout if not completed within five minutes. Instead, the batch processing control instituted by the advanced data query function gives the user the option to wait for the output, to be notified by e-mail when the data retrieval process is complete, or to have the results e-mailed when completed. In the meantime, the user may perform other searches or terminated the physical connection and return later to obtain the search results.

BRIEF DESCRIPTION OF THE DRAWINGS

The foregoing and other novel features and advantages of the invention will become more apparent and more readily appreciated by those skilled in the art after consideration of the following description in conjunction with the associated drawings, of which.

DETAILED DESCRIPTION OF THE PRESENTLY PREFERRED EMBODIMENTS

A preferred embodiment of the invention will now be described in detail with reference to FIGS. 1–4. Those skilled in the art will appreciate that the description given herein with respect to those figures is for exemplary purposes only and is not intended in any way to limit the scope of the invention. All questions regarding the scope of the invention may be resolved by referring to the appended claims.

Figure 1:
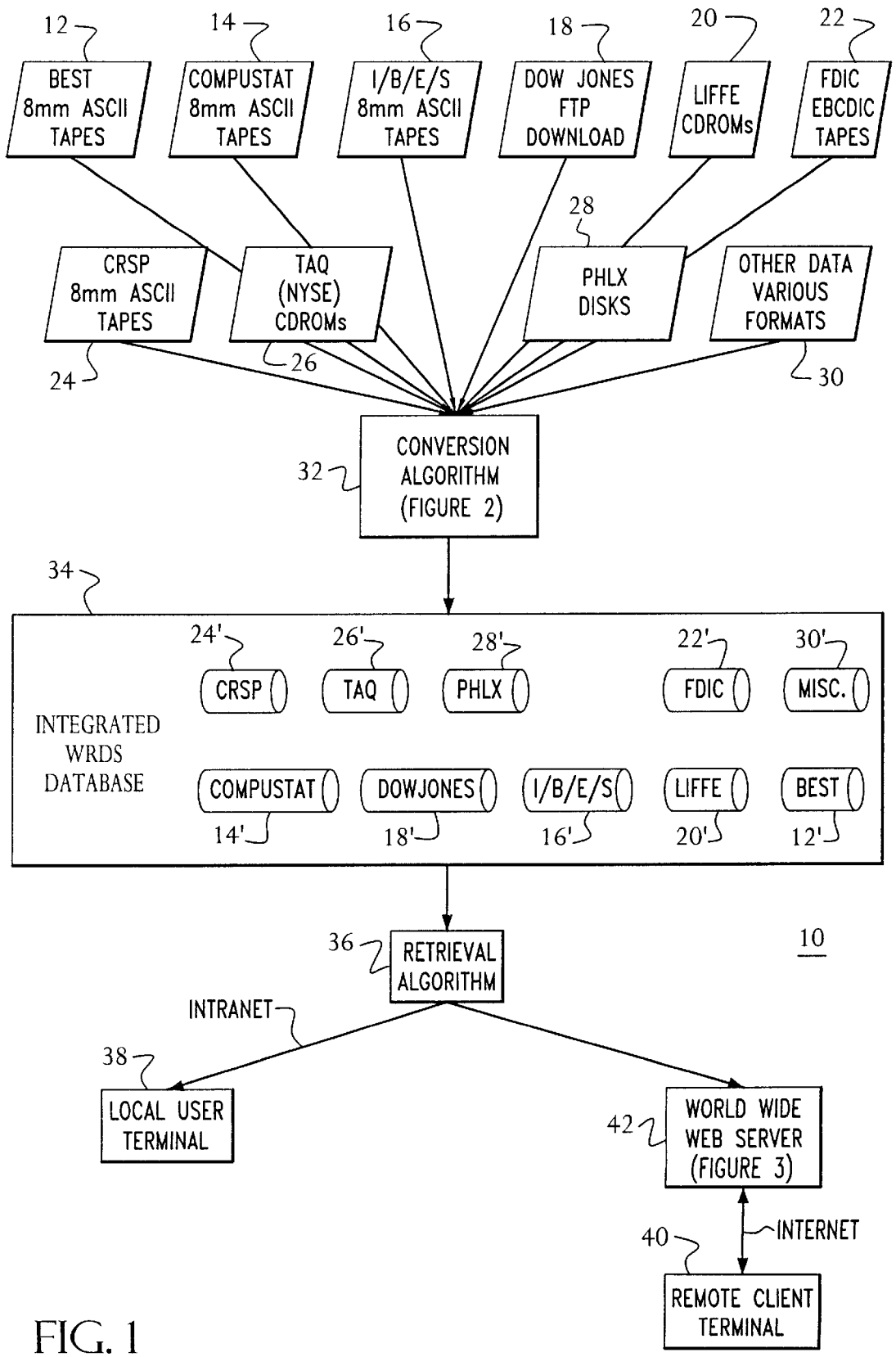
FIG. 1 illustrates a database management system for managing financial data in accordance with a preferred embodiment of the invention.

FIG. 1 illustrates a database management system 10 such as WRDS for managing financial data in accordance with a preferred embodiment of the invention. As illustrated in FIG. 1, raw data from a plurality of financial data sources are provided, including, e.g., the REST data set 12 including financial information and ratios from the insurance industry; Standard & Poor's Compustat data files 14 compiled from balance sheets, income statements, form 10-Ks, and other corporate financial reports; Institutional Brokers Estimate System (I/B/E/S) 16 which is a summary history database of earnings expectations of thousands of companies worldwide; Dow Jones data sets 18 of the Dow Jones Industrial Average (DJIA), Dow Jones Transportation Average (DJTA), and the Dow Jones Utility Average (DJUA); London International Financial Futures and Options Exchange (LIFFE) data sets 20 offer futures and options in several different currencies on interest rates, government bonds, equity indices, commodities, and on individual UK equities; Federal Deposit Insurance Corporation (FDIC) data 22 on banking institutions; Center for Research in Security Prices (CRSP) data 24 containing company stock prices and returns; Trade and Quote (TAQ) data 26 contains intraday transactions data (trades and quotes) for all securities listed on the New York Stock Exchange (NYSE) and American Stock Exchange (AMEX), as well as Nasdaq National Market System (NMS) and SmallCap issues; Philadelphia Stock Exchange (PHLX) data 28 on currency options; and other financial data 30. As illustrated, the raw data is received in various formats such as 8mm ASCII tapes, by downloading from the Internet, via CDROMs, via ebcdic tapes, disks, and a variety of other data formats.

Typically, the database administrator secures access rights to the raw data from the variety of sources and loads the data from the various data sources into a database. Specifically, the data from all of these sources is converted into a common data format by a conversion algorithm 32, which is explained in more detail below with respect to FIG. 2. The data 12'–30' in the common data format is stored in an integrated database 34 for search and analysis. Preferably, each of the relations or data sets from the respective data sources is represented as a table with rows and columns, and for each relation or data set, at least one primary key is defined which is used to link one or more of the relations or data sets in the database to each other. If two or more data sets have one or more common fields, the common field(s) may be used as the primary key; however, if the data sets have no common fields, a common field may be added at the time of conversion.

The database management system of the invention supports three levels of abstraction: physical, conceptual, and external. Briefly, the physical abstraction is how the data are stored; the conceptual abstraction is what data is stored; and the external abstraction describes data as the user sees it. The physical abstraction defines how and where the relations described in the conceptual abstraction (or the data) are actually stored on secondary storage devices such as disks and tapes. The physical abstraction also describes details such as file organization and auxiliary data structures or indexes used for fast retrieval. Decisions about how to store relations must be made and indices must be created to speed up important operations. After careful analysis of the individual data files and their characteristics, all files are sorted, indexed and stored in the database in a common data format. The conceptual abstraction describes all relations or set of records that are stored in the database. Examples include the page and file descriptions of the database, for example, CRSP data files and the BEST data set of financial data.

Finally, the external abstraction allows access to the data in the database for customized searching and presentation and for authenticated access. The external abstraction is dependent on the query (Simple Data Query or Advanced Data Query), the user environment (telnet session, X-Windows, Web), and various output format options available such as HTML format, comma delimited, space delimited text and SAS® transport format.

Since the data in integrated database 34 is stored in a common data format, such as that provided for SAS® data sets, a plurality of data sets may be searched using a single search protocol (e.g., SAS®) rather than a different search protocol for each data set. In particular, the data is retrieved by a retrieval algorithm 36 which reads the data in the common data format and reformats the retrieved data for display to the user. In a preferred embodiment, the data access and analysis is done locally at the integrated database 34 in the framework of the SAS system and CGI programming protocol. Then, as illustrated in FIG. 1, the retrieved data may be displayed on a local user terminal 38 which is part of the computer network or Intranet including integrated database 34, or the retrieved data may be provided to a web browser of a remote client terminal 40 over the Internet via a World Wide Web server 42. Access to integrated database 34 via the World Wide Web will be explained in more detail below with respect to FIGS. 3 and 4.

Figure 2:
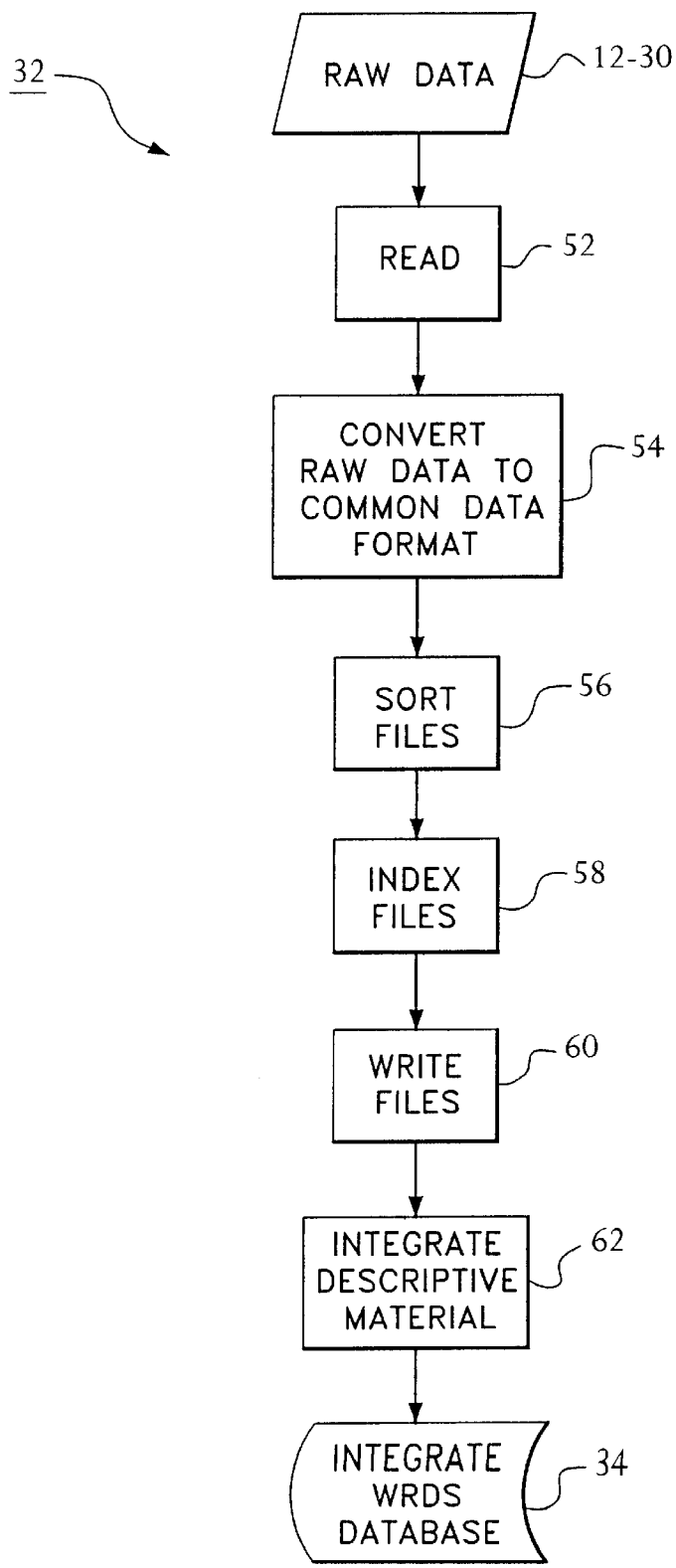
FIG. 2 illustrates a simplified flow diagram of a conversion algorithm for data organization and integration procedures for creating direct access data sets in the integrated database.

FIG. 2 illustrates a simplified flow diagram of the preferred conversion algorithm 32 for data organization and integration procedures for creating direct access data sets in integrated database 34 in accordance with the techniques of the invention. As illustrated, the raw data 12–30 is received in various formats and on different media. In the financial database example of FIG. 1, such raw data is usually provided in ASCII, plain text, or binary format and is received on 4 mm or 8 mm tapes, CD ROMS, 9 track tapes, diskettes, or by electronic transfer. As will be appreciated by those skilled in the art, the binary or ASCII formats are just listings of data records. The raw data 12–30 is incorporated into the database 34 by first reading the raw data 12–30 at step 52 from various magnetic media (ASCII, plain text, or binary format) into a computer code which separates data listings into fields (or attributes or columns) and the type of each field. An example of the type of field might be character or numeric. This relational or tabular format is a simple file structure that coupled with sorting and indexing allows for fast querying. In a preferred embodiment, a procedure extracts time series data from many different kinds of data files distributed by various data vendors and stores them in a SAS® data set. Preferably, filtering and error checking of the raw data is also performed as the raw data is read at step 52. The nature and extent of the filtering and error checking is dependent on the underlying nature of the data.

Once the raw data 12–30 is read at step 52, it is converted into the common database format at step 54. In a preferred embodiment, the common database format is a hybrid of relational, hierarchical, and sequential structures so as to allow the various data to be in a common data format as well as to facilitate integration among the files. During the conversion at step 54, each data set is carefully and systematically evaluated and appropriate indexing and sorting mechanisms are designed. Additional variables for new fields might be generated to facilitate integration with the database 34. For example, the CRSP database includes the following fields: Cusip, Company Ticker, Date, Price of Shares, Shares Outstanding, while the FDIC database includes Company Name, Date, Total Assets, and Tier 1 Capital. A mapping or primary key of common fields between these two databases may be obtained by adding a CUSIP (company ID) field to the FDIC data so that researchers can obtain, e.g., Share Price or Shares Outstanding information for selected companies on the FDIC database.

Such a simple file structure typically stores records in random order. Accordingly, a logical order is imposed on the records at step 56 by sorting them by one or many primary keys depending upon the characteristics of the data. For example, it might be logical to sort records in a file structure by date. Characteristics such as date are standardized in order to be consistent with the common data format in the integrated database 34. This allows for easy searching and efficient merging or querying within the integrated database 34.

An index on a file is designed to speed up operations that are not efficiently supported by the basic organization of records in that file. Accordingly, each file structure and index on fields that are most often retrieved by users are carefully examined at step 58. The database management system also indexes on primary keys that are used as relations among different file structures. As an example, for two file structures, A and B, where file structure A has fields Cusip, Company Name, Date, Ticker, and Assets, and file structure B has fields Ticker, Date, Share Price, and Number of Shares, the two file structures may be linked by primary fields Ticker and Date. By thus indexing according to the primary key of Ticker and Date, the speed of the merge may be improved.

In a preferred embodiment, the indexing method of step 58 is a hybrid between the Indexed Sequential Access Method (ISAM) and the relational data structure. This allows the user to access a single observation, a series of sequential observations, or a series of observations based on a particular qualification and to index accordingly.

After reading, sorting and indexing the data, the file structures are written or stored in the integrated database 34 at step 60. The file structures are categorized and maintained in a hierarchical way that allows for easy integration of additional databases into the integrated database 34. In a preferred embodiment, this architecture is transferable across different operating platforms.

Integration step 62 integrates the documentation provided for each data set that explains the data and how it might relate to other data in the integrated database 34. This integrated data becomes part of the integrated database 34.

As noted above with respect to FIG. 1, data is retrieved from the integrated database 34 using retrieval algorithm 36. Preferably, retrieval algorithm 36 provides functionality whereby the user can retrieve information in a variety of formats including HTML, comma delimited, or space delimited text, depending upon the connection to the user terminal. In a preferred embodiment, the retrieved data is presented to the user via a common database interface which is provided to all users regardless of the data source being accessed. Also, the retrieved data may be provided to a World Wide Web server 42 (FIG. 1) and provided over the Internet to the web browser of a remote client terminal 40. This process will now be described with respect to FIGS. 3 and 4.

Figure 3:
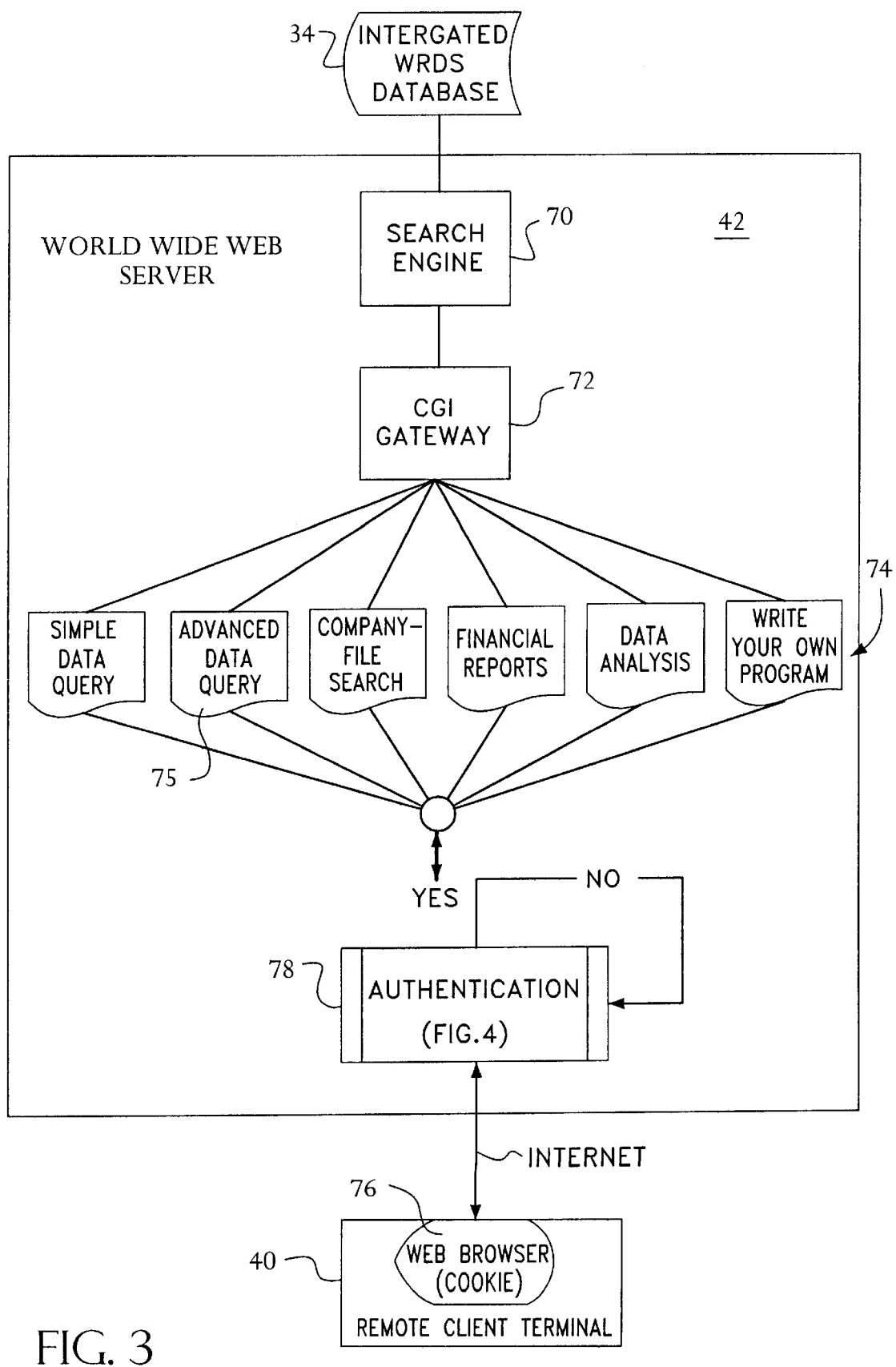
FIG. 3 illustrates the World Wide Web server of FIG. 1 which provides access to the integrated database by a remote user via the Internet.

FIG. 3 illustrates in more detail the World Wide Web server 42 which provides access to integrated database 34 by a remote user via the Internet. As illustrated, the World Wide Web server 42 includes a search engine 70 which has a library of customized precise macro programming routines designed to accept a modified form of the user's data criteria specification and submit it for comprehensive processing. Preferably, data retrieval is accelerated by direct access query commands that utilize indexes of data sets within the integrated database 34. The tabled output is concurrently formatted according to the user's collected preferences. Of course, the search engine 70 is also accessible to local users via an Intranet, telnet, and the like. The server side connection to the database 34 is preferably an interpretive Common Gateway Interface (CGI) gateway 72 between the search engine 70 and the user's refined criteria specification interface 74. CGI commands collect input as entered by the user and translate the objects into structured symbols and query command segments in a conventional fashion. The CGI gateway 72 passes these objects to the search engine 70 and initiates the data retrieval process by retrieval algorithm 36. Further CGI processing involves monitoring the retrieval algorithm 36 and generating logs of system activity. Also, as will be explained in more detail with respect to FIG. 4, the CGI processing also includes an analysis of the cookies returned from the user's web browser for authentication purposes. The programming language used for CGI gateway 72 may be, e.g., Perl, C, and Visual Basic, the choice depending upon the needs of the application.

Predefined graphical user interface forms 74 are provided as part of the user interface for entering retrieval criteria specifications and providing hyperlinked descriptions of the content of integrated database 34 to the user. As illustrated, forms 74 include applications for commonly requested reports such as balance sheets, price graphs, and other analytical comparisons, as well as flexible request forms which allow the user to customize generated reports and data selection. These forms are preferably selection options on the Home Page of the World Wide Web Server 42.

In a preferred embodiment, the graphical user forms in user interface 74 include a criteria specification interface form 75 on the Web Server interface for an Advanced Data Query that gives the user flexibility in screening and formatting subsets of complex financial data. Unlike simple data query web forms previously used in WRDS, the Advanced Data Query gives the user the ability to search through multiple data sets with a single query. The Advanced Data Query also provides for unlimited filtering of key values from a list on the user's account. For example, the user can input the name of a file on his or her UNIX® account that contains a list of company ticker symbols, and the search engine 70 will retrieve the list through an FTP routine and extract data for only those companies whose ticker symbols were listed. Another feature of the Advanced Data Query allows users to specify criteria for selection based on any of the fields in the data set. For example, a user can request data for all companies with net sales greater than $500 million and total assets of less than $1 billion. A user may search across data sets by using a common field or primary key across the desired data sets. Format options for the output data include comma delimited text, fixed-width text, HTML tables, or a SAS transport file. In addition, each of the format options can be compressed in one of a variety of common compression formats to minimize download time.

All of the features of the Advanced Data Query are implemented using Perl scripting to spawn and monitor the process, and SAS macro programs to extract and format the data. The web form 75 emulates batch processing of queries by spawning a child process for the data request and monitoring its status. When the process is finished, the user is sent an e-mail message that contains a URL address where the output can be retrieved. The user's e-mail address may be requested in the Advanced Data Query web form 75 for this purpose. This approach is different from common web queries which wait for the process to finish and timeout if not completed within five minutes. The batch processing control instituted by the Advanced Data Query gives the user the option to wait for the output, to be notified by e-mail when the data retrieval process is complete, or to terminate the physical connection and return later to get the query results.

As illustrated in FIG. 3, the remote client terminal 40 preferably accesses the World Wide Web server 42 via the Internet using a web browser 76. As known to those skilled in the art, web browser 76 is a universal Internet application that allows viewing and downloading of data over a large variety of networked computing environments. Use of a common web browser 76 ensures portability and accessibility to the integrated database 34 by any registered user who has access to the Internet, regardless of operating system and geographic location.

Since it is desired that access to the integrated database 34 be limited to authorized users, an authentication process 78 is provided in accordance with the invention to prevent unauthorized access to the integrated database 34. Generally, the authentication process 78 comprises written programming statements on the server side which extend the capabilities of the web server software 42 to verify authenticity of access rights and maintain privileges throughout the user's session. Requests for viewing a web page are passed through, e.g., an NSAPI (Netscape Application Programming Interface) protocol which determines which requesters have the authority to receive the document. Proper authority is established by prompting for a user ID and password and identifying the user as a registered account holder on one of the UNIX systems controlled by the manager of database 34.

Figure 4:
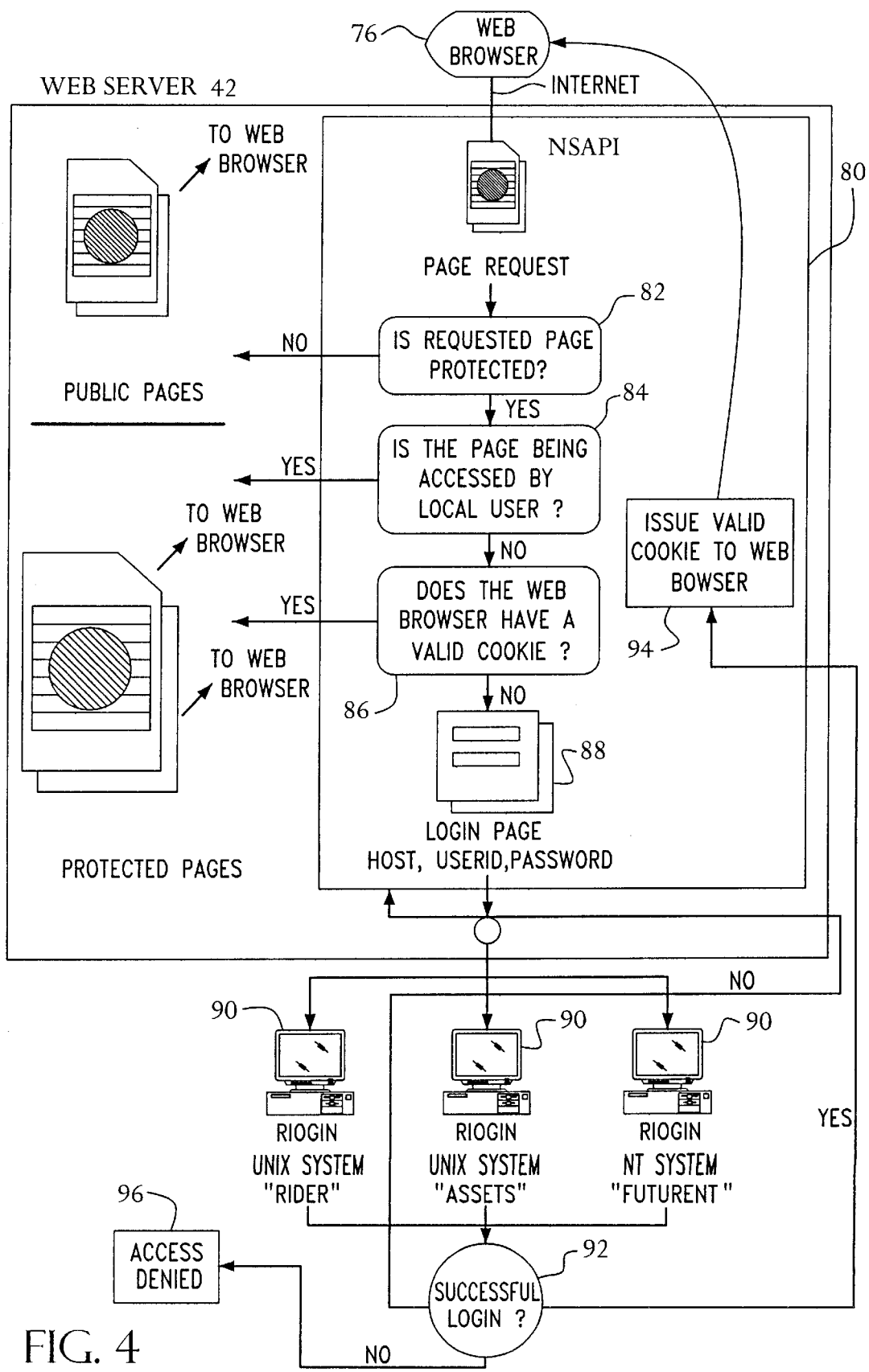
FIG. 4 illustrates a preferred embodiment of the authentication process for accessing the integrated database of the invention via the Internet.

Common methods of authenticating valid users and controlling access to protected web pages rely on the functionality of the web server to manage an independent database of users. In such systems, if the webmaster wants to give a user access to a protected page, a user account must be created on the web server and appropriate access rights must be specified. By contrast, the authentication process of the invention emulates a distributed computing environment where each group or department to access the database 34 has a UNIX or NT system with user accounts. FIG. 4 illustrates the authentication process of the invention whereby a first group has user accounts on, e.g., the "Futures" system, a second group has user accounts on the "Equity" system, and a third group has user accounts on the "Finance" system, etc. In this fashion, the Web authentication system 78 of the invention allows users from heterogeneous systems to be granted authorization with varying access privileges for accessing data from database 34 via the World Wide Web.

As illustrated in FIG. 4, requests from web browser 76 for viewing web pages are sent through the web server NSAPI (Netscape Application Programming Interface) 80, which requires that all page requests be evaluated by the authentication program 78 before a page is served to the web browser 76. Authentication program 78 implements a series of three checkpoints to determine if the page request from the web browser 76 may be served.

As shown in FIG. 4, the first checkpoint 82 asks whether the requested page is protected. At checkpoint 82, the URL of the requested page is compared to a list of all protected document locations which is stored within the web server 42. If the requested page does not match any of the URL segments in the list, then the requested page is a public page and can be served to the web browser 76. However, if the requested page is found within the list at step 82, then access control is passed to the next checkpoint 84.

At step 84, the authentication program 78 checks the host name of the system where the page request is coming from. If the domain of the requesting host is within the domain specified in the web authentication configuration (i.e., within the domain of web server 42), then the requested page is served. However, if it is determined at step 84 that the page request comes from a domain outside of the domain of web server 42, then access control is passed to the next checkpoint 86.

At step 86, if the user has already been authenticated as an authorized user of integrated database 34, a "cookie" signifying this authorization will have been sent to the web browser 76 at the time of authorization. As known to those skilled in the art, "cookies" are a general mechanism which web server side connections (such as CGI scripts) can use to both store and retrieve information from the client side of the Internet connection. In particular, a web server, such as web server 42, when returning an HTTP object to a client (web browser 76) may also send a piece of state information which the client (web browser 76) will store. Included in that state object is a description of Universal Resource Indicators (URIs) for which that state is valid. Any future HTTP requests made by the client (web browser 76) which fall in that range will include a transmittal of the current value of the state object from the client (web browser 76) back to the server (web server 42). This value of the state object is called a "cookie." Thus, at step 86, if the authentication program 78 finds that a returned cookie has been validly set, then the requested page is served; otherwise, the user is prompted with the login page at step 88.

On the login page at step 88, the user selects one of the user systems 90 from a list and enters his or her user ID for the system and the user's password. This information is validated through program calls to the specified system. If the information supplied is valid, it is determined at step 92 that the login is successful, and the requested web page is served and a cookie is sent to the user's web browser 76 at step 94 so that the user will not be prompted to login again during the present browser session. After the user ends the browser session, the cookie is cleared if the user account information is invalid, and the user is again prompted with the login page at step 88 when a protected page is requested. On the other hand, if the login is not successful, access to the protected web page is prohibited at step 96. The login process may then be repeated unless other security measures prevent the login attempt.

While most Internet authentication mechanisms rely on a single machine to provide authentication, those skilled in the art will appreciate that the authentication mechanism of the invention operates in a heterogeneous environment wherein the user's central machine is queried for authentication. Moreover, since "cookies" are conventionally supported by web browsers such as the popular Netscape web browsers (versions 1.1 and higher), the authentication technique of the invention may be implemented without the requirement that a session identifier be appended to service requests between the server system and the client system as proposed, e.g., by Levergood et al. in U.S. Pat. No. 5,708,780.

Those skilled in the web browser art will appreciate that a cookie is a name/value pair much like the named parameters in a CGI query string. Typically, the value of the cookie is a string which can be placed in a data structure (e.g., a scalar value, an array reference, or an associative array reference). A cookie is introduced to the client by including a set-cookie header as part of an HTTP response, which is typically generated by a CGI script and sent to the web browser. The web browser then maintains a list of cookies that belong to a particular Web server and returns them to the CGI script during subsequent inter-actions. The cookie is retrieved by name without the value parameter. These characteristics of a cookie make it particularly useful for authentication purposes in accordance with the invention.

Those familiar with "cookies" will also appreciate that a cookie has several optional attributes. For example, a cookie may include a time/date string that indicates when the cookie expires. Also, the cookie may include a partial or complete domain name for which the cookie is valid. In accordance with the invention, the web browser 76 will return the cookie to web server 42 if the domain name of web server 42 matches the partial domain name in the cookie. However, if no domain is specified, then the web browser 76 will only return the cookie to a web server on the host computer the cookie originated from. Also, a cookie may include a "secure" parameter which can be set to "true" if the cookie is to be used only within a secure channel, such as a channel which transmits using the Secure Socket Layer (SSL) protocol. Other features of cookies are known to those skilled in the art and may be determined by checking, e.g., http://www.cookiecentral.com.

Those skilled in the art will also appreciate that numerous other modifications to the invention are possible within the scope of the invention. For example, those skilled in the art will appreciate that the technique of the invention may be used to access data from heterogeneous data sources other than financial data. Those skilled in the art will also appreciate that the authentication and Internet search techniques described herein may be used in other contexts in which authentication of the user is desired before granting access, e.g., on-line shopping sites, adult-only web sites, Internet based banks, and the like, and in which delays in returning the search results may be anticipated. Accordingly, the scope of the invention is not intended to be limited to the preferred embodiment described above, but only by any appended claims.

We claim:

1. A system for managing access to a database by authorized users via a computer communications network, each user sending a page request for a page from said database using a browser program operating on a client computer connected to said computer communications network, comprising:

a server which provides requested pages from said database to a requesting user's browser program via the computer communications network in response to said page request from the requesting user's browser program if the requesting user is authorized to receive the requested page from said database, said server including a search engine which searches said database and data query software which is accessible to the user via an interface of said server that screens and formats subsets of data in said database whereby the user can search through multiple data sets with a single data query specifying criteria for selection based on a field common to at least two data sets of said multiple data sets, said data query software emulating batch processing of data queries from the user by spawning a child process for each data request in a data query from the user and monitoring the status of said child process, said data query software further sending the user a message that contains an address where the processed output can be retrieved by the user when the child process is finished; and an authentication program operating at said server, said authentication program determining if the requested page is protected and, if so, checking a cookie from the requesting user's browser program to determine if said cookie has been validated to indicate that the user has been authenticated as an authorized user of said database prior to receipt of said page request from the requesting user's browser program, whereby a requested protected page is provided to the requesting user's browser program only if said cookie has been validated.

2. A system for managing access to a database by authorized users via a computer communications network, each user sending a page request for a page from said database using a browser program operating on a client computer connected to said computer communications network, comprising:

a server which provides requested pages from said database to a requesting user's browser program via the computer communications network in response to said page request from the requesting user's web browser program if the requesting user is authorized to receive the requested page from said database, said server including a search engine which searches said database; and data query software accessible to the user via an interface of said server, said data query software screening and formatting subsets of data in said database whereby the user can search through multiple data sets with a single query specifying criteria for selection based on a field common to at least two data sets of said multiple data sets, said data query software emulating batch processing of data queries from the user by spawning a child process for each data request in a data query from the user and monitoring the status of said child process, said data query software further sending the user a message that contains an address where the processed output can be retrieved by the user when the child process is finished.

3. A method of authenticating access to a database containing protected pages by a browser program which provides page requests via a computer communications network to a server associated with said database, comprising the steps of:

said browser program sending a page request to said server via the computer communications network;

determining if the requested page is protected, and if the requested page is not protected, then serving the requested page to the browser program;

if the requested page is protected, then determining if a domain of the computer system operating said browser program is within a domain of said server and, if so, serving the requested page to the browser program;

if the domain of the computer system operating said browser program is outside of the domain of said server, then checking whether a valid cookie has been received from the browser program indicating that a user of said browser program has been authenticated as an authorized user of said database prior to receipt of said page request from said browser program;

serving the requested protected page to said browser program only if said valid cookie has been received by said server;

searching through multiple data sets in said database with a single data query from said browser program specifying criteria for selection based on a field common to at least two data sets of said multiple data sets;

emulating batch processing of data queries from the user by spawning a child process for each data request in a data query from the user and monitoring the status of said child process; and sending the user a message that contains an address where the processed output can be retrieved by the user when the child process is finished.

4. The method of claim 3, wherein if it is determined that a valid cookie has not been received in said cookie checking step, said method comprises the additional steps of serving a login page to said browser program, the user of the browser program providing login information to said server, and, if the login information is valid, said server serving the requested page to said browser program and said server sending said valid cookie to said browser program.

5. The method of claim 4, comprising the additional step of clearing said valid cookie at the end of a session with said browser program.

* * * * *